United States Patent [19]

Webster et al.

[11] Patent Number: 4,552,662
[45] Date of Patent: Nov. 12, 1985

[54] INTEGRAL FUEL FILTER HEAD AND ADAPTER FOR MULTIPLE FUEL FILTER CANISTERS

[75] Inventors: Timothy P. Webster, Columbus; Ervin E. Bush, Westport; Roger D. Sweetland, Columbus, all of Ind.

[73] Assignee: Cummins Engine Company, Inc., Columbus, Ind.

[21] Appl. No.: 626,937

[22] Filed: Jul. 2, 1984

[51] Int. Cl.4 .............................................. B01D 29/24
[52] U.S. Cl. .................................. 210/232; 210/335; 210/444
[58] Field of Search ............... 210/232, DIG. 17, 444, 210/172, 335

[56] References Cited

U.S. PATENT DOCUMENTS

| | | | |
|---|---|---|---|
| 3,217,942 | 11/1965 | Humbert, Jr. | 210/DIG. 17 |
| 3,395,808 | 8/1968 | Offer | 210/444 |
| 3,567,023 | 3/1971 | Buckman et al. | 210/DIG. 17 |
| 3,743,096 | 7/1973 | Harvey, Jr. et al. | 210/232 |
| 3,804,257 | 4/1974 | Sommermeyer | 210/335 |
| 3,914,176 | 10/1975 | Holmes | 210/340 |
| 4,045,349 | 8/1977 | Humbert, Jr. | 210/232 |
| 4,192,750 | 3/1980 | Elfes et al. | 210/232 |
| 4,334,995 | 6/1982 | Mahon | 210/340 |
| 4,452,695 | 6/1984 | Schmidt | 210/DIG. 17 |

FOREIGN PATENT DOCUMENTS 1026905 3/1958 Fed. Rep. of Germany ...... 210/335

Primary Examiner—Tim Miles
Attorney, Agent, or Firm—Sixbey, Friedman & Leedom

[57] ABSTRACT

A liquid fuel operated engine has an integral fuel filter head formed unitarily on a part of the engine, particularly the engine cylinder head. The integral fuel filter head is designed to matingly receive a fuel filter canister or an adapter for enabling a plurality of fuel filter canisters to be attached thereto. In accordance with a preferred embodiment, the adapter is a plate-like structure having a base mounting socket on one side and a pair of filter canister mounting sockets on an opposite side thereof. The integral fuel filter head is, in accordance with the preferred embodiment, situated on the underside of a horizontally projecting flange formed on a side of the cylinder head. The adapter is designed to receive the same type of filter canisters as does the integral filter head.

21 Claims, 12 Drawing Figures

INTEGRAL FUEL FILTER HEAD AND ADAPTER FOR MULTIPLE FUEL FILTER CANISTERS

DESCRIPTION

1. Technical Field

The present invention relates to the field of liquid fuel operated engines, and in particular, to the means by which one or more fuel filters may be attached to an integral fuel filter head formed unitarily as a part of the engine.

2. Background Art

It is conventional practice to utilize a fuel filter situated in an external fuel delivery line, to clean liquid fuel used to operate an engine, such as an internal combustion engine.

It is also conventional to form the filter head for the lubricating oil filter of a vehicle engine as an integral part of the vehicle engine (see U.S. Pat. No. 3,395,808), normally at a bottom portion of the engine. However, such integral arrangements have not normally been utilized in conjunction with single or multiple fuel filter arrangements.

It has also been known to connect multiple filters to an engine by means of a manifold-type filter head that is connected to the engine. An example of such an arrangement is the filter assembly having an extruded filter head as shown and described in U.S. Pat. No. 4,334,995 for use in removing contaminants from hydraulic fluid for off-road vehicles, such as tractors. However, such a manifold-type filter head has not been utilized for connecting fuel filters directly to an engine, and particularly, not in a manner which enables an integral fuel filter head that is designed for matingly receiving a fuel filter canister, to be converted for use with multiple fuel filter canisters.

Thus, it has not been possible for one or more fuel filters to be mounted directly to an engine with a minimum number of parts being required, and especially, in close proximity to the fuel pump of the engine.

DISCLOSURE OF THE INVENTION

It is an object of the present invention to provide a liquid fuel operated engine with an integral fuel filter base formed unitarily on a part of the engine in a manner that will enable either a single fuel filter canister or multiple fuel filter canisters to be attached thereto.

It is a further object in accordance with the present invention to enable single or multiple fuel filter canisters to be attached directly to the engine with a minimum number of parts and in close proximity to the fuel pump and engine cylinders.

Yet another object of the present invention is to provide an adapter for converting of the single filter canister, integral fuel filter head to one handling multiple filter canisters, especially whereby the same types of filter canisters may be utilized with both the integral fuel filter head and the multiple filter adapter.

These and other objects are achieved in accordance with a preferred embodiment of the present invention by providing an integral fuel filter head on the cylinder head of the engine, in communication with the fuel lines within the engine for delivery of clean fuel to and receipt of unfiltered fuel from respective ones of the fuel lines. A fuel filter adapter is detachably secured to the integral fuel filter base and has a body formed with a base mounting socket for matingly engaging the fuel filter socket of the integral fuel filter base and at least two filter sockets for matingly receiving a respective fuel filter canister, passages being formed in the body of the adapter for enabling unfiltered fuel to be fed from the engine through the base mounting socket, the filter sockets and filter canisters attached thereto, and for filtered fuel to be returned through the base socket to the engine.

In order to achieve a compact arrangement, the integral fuel filter head is formed on a horizontally projecting flange located on one side of the cylinder head, particularly on an underside of the flange, while the adapter is a plate-like structure having its base mounting socket, for engaging the fuel filter socket of the integral fuel filter head, located on its top side, and the filter sockets for receiving the filter canisters located on its bottom side.

Advantageously, the socket of the integral fuel filter head and the filter sockets of the adapter are constructed for receiving the same types of filter canisters. Moreover, by arranging the mounting socket of the adapter coaxially over a first of its filter sockets, an externally threaded tube may be coaxially threaded therethrough so as to serve as a fuel delivery passage, a means for attaching the adapter to the integral filter base, and a means for attaching a filter canister to the first filter socket.

Other features and advantages of the present invention will become apparent from the following description when taken in connection with the accompanying drawings which show, for purposes of illustration only, a single embodiment in accordance with the present invention.

BEST MODE FOR CARRYING OUT THE INVENTION

Figure 1:
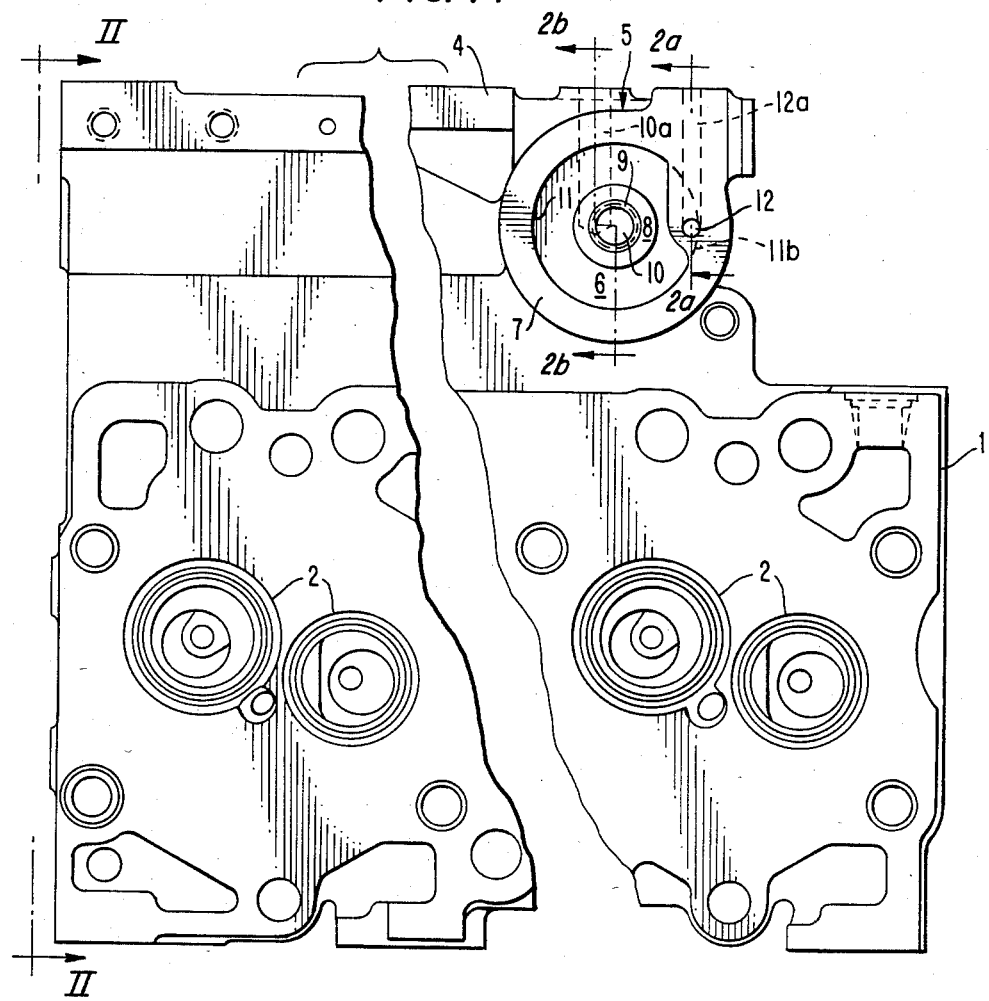
FIG. 1 is a broken bottom plane view of a cylinder head of an engine with an integral filter head in accordance with the present invention.

FIG. 1 shows a bottom view of an engine cylinder head 1 of a multi cylinder engine, a pair of cylinder valve ports 2 being provided for each cylinder. While the cylinder block 100 of the engine is, itself, only schematically depicted by way of broken lines in FIG. 2, it is noted that, in a conventional manner, the cylinder head is mounted on top of the cylinder block 100 so that each pair of valve ports 2 would overlie a respective cylinder and the piston contained therein.

Projecting laterally from the side of the cylinder head 1 is a horizontally projecting flange 4. Formed unitarily with the cylinder head, on the underside of the flange 4, is an integral fuel filter head 5. Filter head 5 is in the form of a socket having an annular recess 6 defined between a projecting perimetric rim 7 and a central cylindrical projection 8. Central projection 8 contains a fuel port 10 provided with an internal threading 9 through which clean fuel is delivered to an intersecting discharge passage 10a (illustrated in dashed lines) from which fuel is delivered to a fuel pump mounted on the engine for ultimate delivery to the engine cylinders. The projecting rim 7, as can be seen, has a partially cylindrical inner wall 11 that has a radially inwardly bulged portion 11a within which a port 12, for the delivery of dirty fuel, is provided which, as a whole, is radially inwardly displaced relative to an imaginatory continuation of the cylindrical inner wall 11 of projecting rim 7 (represented by broken line portion 11b).

Figure 2A:
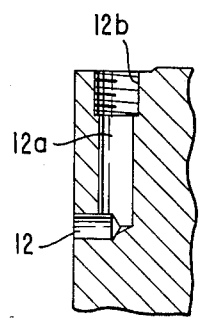
FIG. 2a. is a broken away cross-sectional view of the filter head of FIG. 1 taken along line 2a—2a of FIG. 1.
Figure 2B:
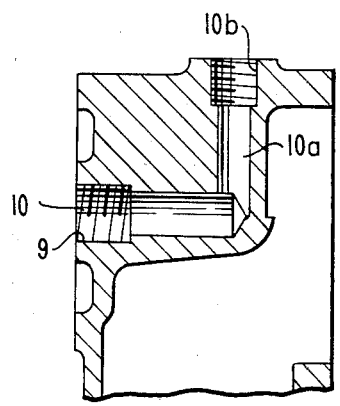
FIG. 2b. is a broken away cross-sectional view of the filter head of FIG. 1 taken along line 2b—2b of FIG. 1.
Figure 2:
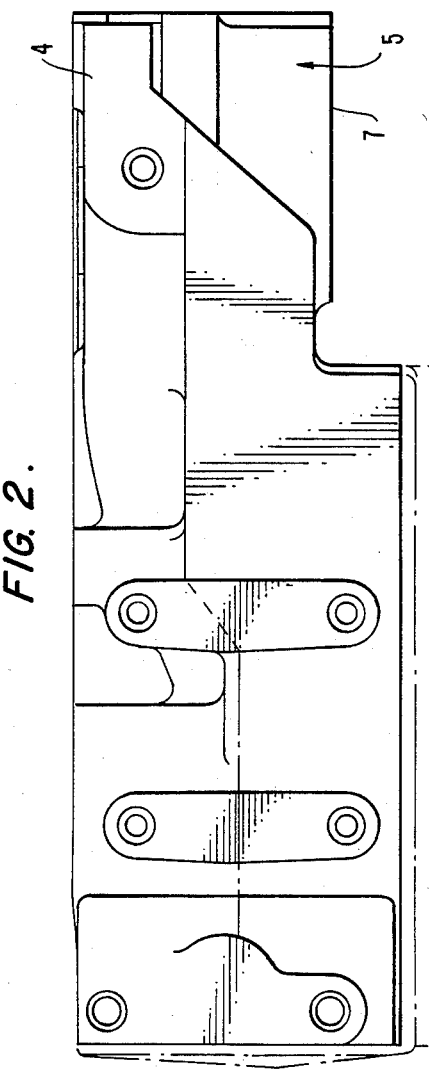
FIG. 2 is a side plane view of the cylinder head of FIG. 1 taken in the direction of arrow II wherein the view has been inverted to show the head in its operative position.
Figure 5:
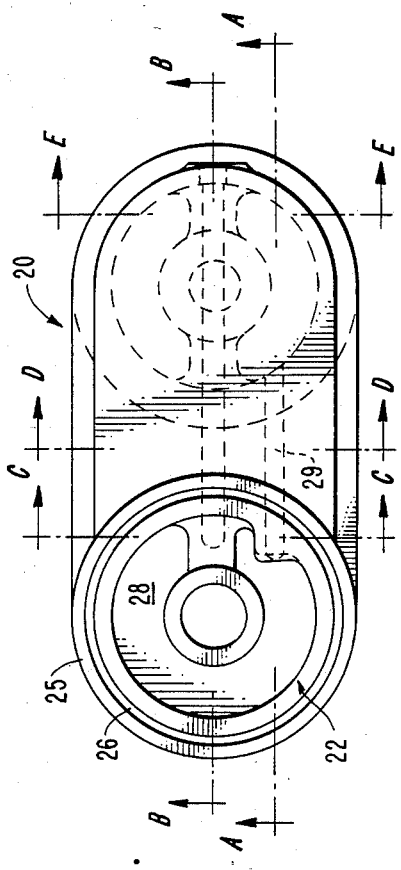
FIG. 5 is a top plane view of an adapter in accordance with the present invention.

As illustrated in FIG. 2a, engine fuel is supplied to port 12 through a generally horizontal supply passage 12a, one end of which terminates at a threaded supply port 12b adapted to be connected with a fuel supply line (not illustrated) externally mounted on the engine block. In a similar manner, FIG. 2b illustrates a generally horizontal discharge passage 10a connected at one end to fuel port 10 and terminating at its other end at a threaded discharge port 10b. An externally mounted discharge fuel line (not illustrated) is connected at one end to discharge port 10b and at its other end to the engine fuel pump 102 (dashed lines FIG. 2) mounted closely adjacent to filter head 5. Because the engine fuel pump 102 (FIG. 2) can be conveniently mounted below the projecting flange 4 of the engine head 1 in which head 5 is formed, the external discharge fuel line will need to extend only a short distance to the fuel pump as compared with the overall engine dimensions. This short distance is an important advantage resulting from the formation of projection flange 4 with a filter head on its lower surface.

Figure 4:
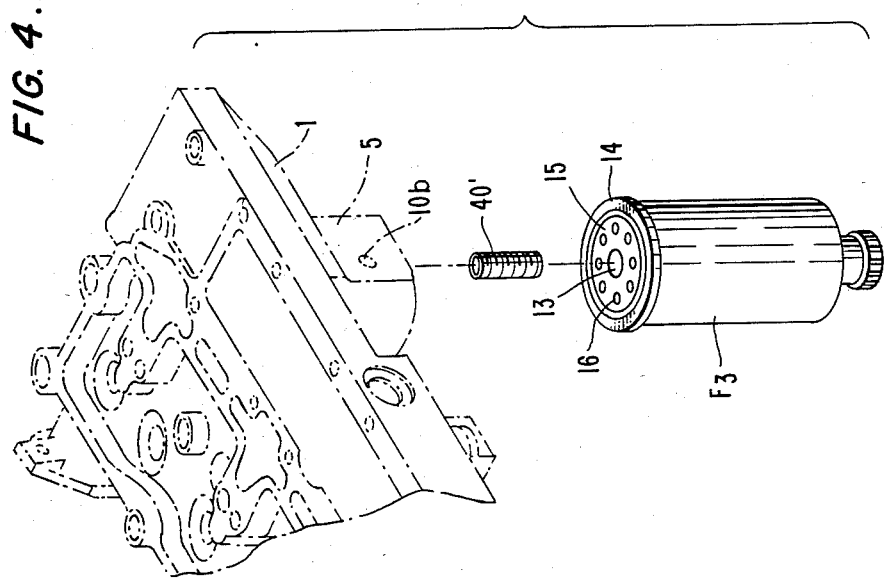
FIG. 4 is an exploded view illustrating a filter head assembly for use with a single filter canister.
Figure 3:
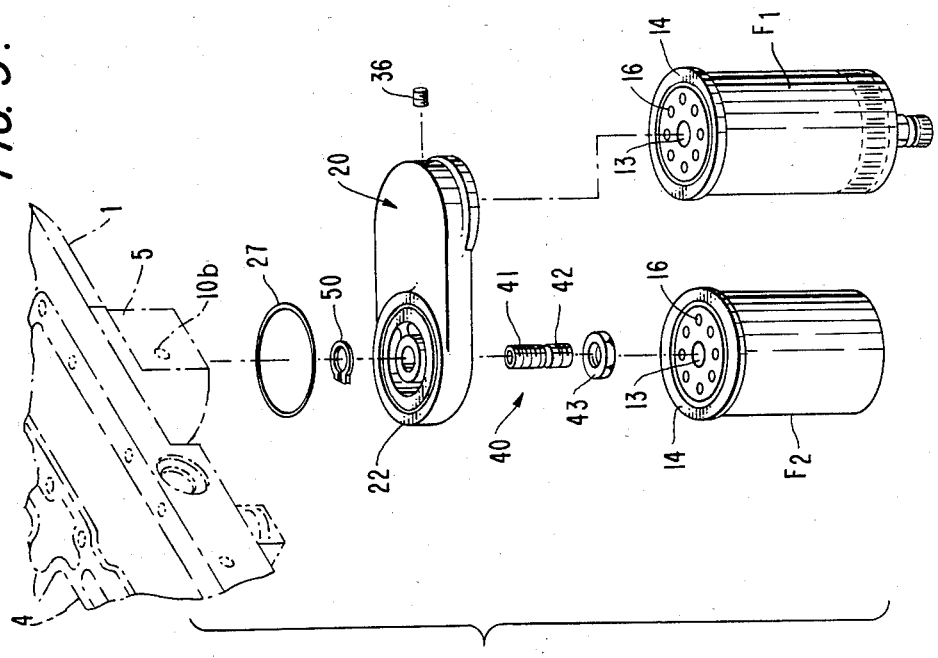
FIG. 3 is an exploded view illustrating a filter head assembly for use with multiple filters.
Figure 6:
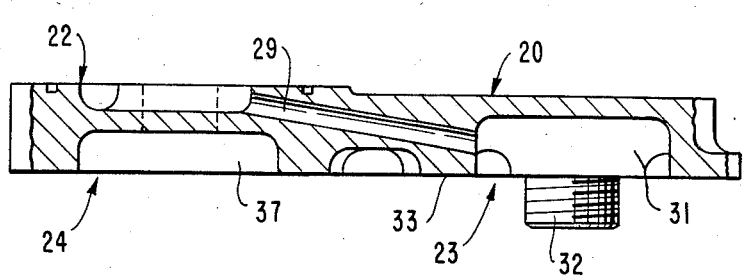
FIG. 6 is a sectional view taken along line A—A of FIG. 5.

As represented by FIGS. 3 and 4 (wherein a portion of the cylinder head 1 is depicted in phantom lines), either a pair of filters $F_1$, $F_2$ may be connected to the filter head 5, via the intermediary of an adapter 20, or a single filter $F_3$ may be secured directly to the filter head 5. In the latter case, an externally threaded tube or pipe section 40′ is threaded into filter outlet 13 (which has a complementary internal threading) and into the threading 9 of the port 10 of the filter head 5 until the rim 14 of the filter is sealed tight against the end wall of the outer rim 7 of the filter head 5. When the filter is so mounted, dirty fuel from the port 12 of the filter head 5 will be free to pass into the ring-shaped recess 15 of the filter and into the recess 6 of the filter head 5, from which the fuel may pass through the openings 16 of the filter into the body of the filter itself.

The invention contemplates the use of conventional diesel and gasoline fuel filters having radially inner and outer chambers separated by filtration materials through which fuel may pass. Thus, fuel passing through the openings 16 will travel radially inwardly through the filtration walls into an inner filter chamber, from which it then will pass upwardly through the center of pipe 12 into fuel port 10 for delivery through discharge passage 10a to the fuel pump of the engine.

When the fuel to be used or engine usage conditions warrant the provision of more than one fuel filter, an adapter 20 forming part of this invention may be utilized to couple a pair of filters $F_1$ and $F_2$ to the integral filter head 5. The nature of adapter 20 will now be described in detail with reference to FIGS. 5–10. The body of the adapter 20 is essentially an elliptical disk-like or plate-like structure having a base mounting socket 22 (by which the adapter 20 is matingly engaged against the integral filter head 5 of the engine) on one side and, on the opposite side thereof, a pair of filter sockets 23, 24 (which matingly receive a respective fuel filter canister).

The base mounting socket 22 has a ring-shaped outer rim wall 25 within which an annular groove 26 is provided for receipt of a sealing gasket 27 (FIG. 3). The top wall of rim 25 (along with gasket 27) sealingly engage against the top surface of projecting rim 7 of integral filter head 5 in a manner creating a leak-free seal therebetween. Rim 25 defines a recess 28 in the top surface of the adapter 20 and this recess 28 communicates with recess 6 of the filter head 5 so that dirty fuel from the port 12 is supplied into the recess 28 from which it travels, via an angle bore passage 29 to a first filter socket 23.

Figure 7:
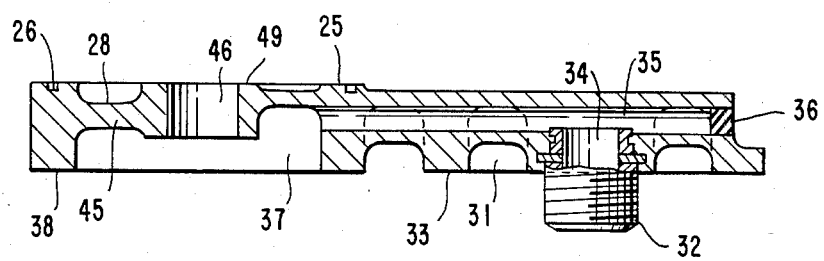
FIG. 7 is a cross-sectional view taken along line B—B of FIG. 5.
Figure 8:
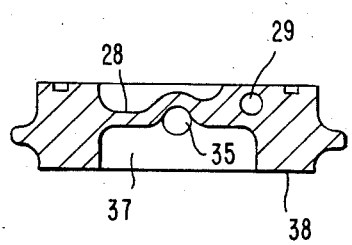
FIG. 8 is a sectional view taken along line C—C of FIG. 5.
Figure 9:
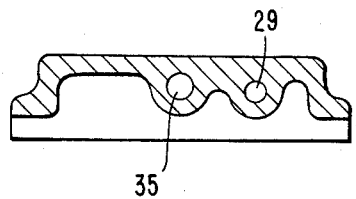
FIG. 9 is a cross-sectional view taken along line D—D of FIG. 5.
Figure 10:
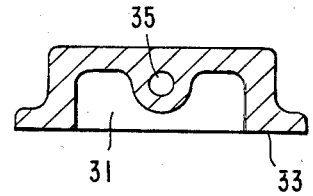
FIG. 10 is a cross-sectional view taken along line E—E of FIG. 5.

Filter socket 23 is provided with a downwardly open recess 31 which receives the dirty fuel delivered through the angle bore passage 29. The recess 31 surrounds an externally threaded tubular connecting piece 32, upon which the filter $F_1$ is threaded until its rim 14 is seated firmly against the bottom wall of perimetric rim 33, which encloses the recess 31. Thus, fuel from the passage 29 travels around the recess 31 and down through the openings 16 of the filter so that, like the situation described with respect to filter $F_3$, the fuel travels radially inwardly through the filter material and then axially upwardly out the filter opening 13. Thereafter, the fuel travels through the interior bore 34 of the connecting piece 32 until it reaches a fuel passage 35 formed through the body of the adapter. The passage 35 can, expediently, be formed by drilling horizontally along a vertical center plane of the adapter from the first socket end thereof to a point where it will join a top end of a recess 37 of the second filter socket 24; then the first socket end of the fuel passage 35 may be closed by a threaded plug 36 (FIGS. 3 and 7).

The second filter socket 24 has a perimetric rim 38 surrounding the recess 37 and against which the rim 14 of the fuel filter canister $F_1$ sealingly engages. For this purpose, a threaded tube or pipe section 40 is provided. Threaded tube 40 has an upper threaded section 41 and a lower threaded section 42, and a nut 43 is threaded onto the lower threaded section of 42 until it reaches a gap between the two threaded sections.

A separating wall 45, located between the mounting socket 22 and the second filter socket 24, is provided with a vertical bore 46. The upper threaded portion 41 of the threaded tube 40 is passed through bore 46 so as to project therebeyond and enable it to be threaded into the internal threading 9 of the central projection 8 of the integral filter head 5. By rotating of the nut 43, the tube 40 may be screwed into threading 9 which will bring the surface 25, with the gasket 26, and the surface 49 of the separating wall 45 into engagement with the facing wall of the projection 8 (optionally through the intermediary of the sealing gasket 50, FIG. 3) so as to secure the adapter to the integral mounting head. The filter $F_2$ is threaded onto the lower portion 42 of the externally threaded tube 40 until such time as the rim 14 of the filter body is sealingly engaged against the lower surface of the rim wall 38 of the second filter socket 24.

Accordingly, fuel traveling from the first fuel socket through the passage 35 will be distributed through the recess 37 and ports 16 into the second filter canister $F_2$. The fuel then travels inwardly through the filtering material and up through the outlet 13 and tube 40 into the clean fuel receiving bore 10.

While three different filter canisters $F_1$–$F_3$ are illustrated in FIGS. 3 and 4, such is simply for illustration purposes in order to indicate that different filter canisters can be utilized. However, any of these filter canisters, or others, may be used on the filter head 5, and or filter sockets 23,24, so long as they are all of the same type. By same type, it is meant that they are all of the out-to-in flow type having a central aperture 13 and a surrounding series of circumferentially spaced in-flow ports 16, as well as a sealing rim 14 of a diameter matched to the rim 7 of the integral head 5 and the rims 33,38 of the filter sockets 23,24 of the adapter 20. This provides the advantage that any equivalent commercially available filter canister of this type may be utilized and the same type of filter canisters can be utilized with both the integral head 5 and the adapter 20.

Furthermore, by forming the integral filter head 5 on the flange 4 extending horizontally outwardly from the cylinder head 1, the fuel filter (or filters) can be situated in relatively close proximity to both the fuel pump of the engine and the cylinders to which the fuel is ultimately to be delivered.

It is also noted that, since the cylinder head of an engine must be machined to provide passages and the like, forming of the filter head on the cylinder head enables machining thereof to be performed during the usual machining of the cylinder head. Additionally, since the crankcase portion of an engine (located at the bottom thereof and not shown in the drawings) is normally wider than the cylinder head of the engine, enlargement of the cylinder head in the manner shown will not significantly increase the space occupied by the engine, particularly where the integral head 5 is situated on the underside of the flange 4 so that the filter or filters hang down from the flange 4. With filters of the type shown in FIGS. 3 and 4, such canisters can be received, even with the use of the adapter 20, in the space between the top of the crankcase bulge of the engine and the flange 4. As a result, the engine with the fuel filters assembled thereon, is virtually as compact as a standard engine, and the number of parts required for attachment of the fuel filter to the engine is minimized. Still further, by virtue of the fact that the canisters hang downwardly, when the filters are changed, they may be removed without excessive spillage of fuel that may be retained within the filter canisters.

The adapter 20 is easily attached or detached from the integral fuel filter head 5, and because of its flat, plate-like design, it takes up a minimum of space, and, therefore, does not significantly reduce the clearance space available for attachment of a filter canister to its underside, especially where such space is limited by the distance between the integral head 5 and the top of the crankcase bulge of the engine.

INDUSTRIAL APPLICABILITY

The present invention is applicable to diesel, internal combustion and other types of engines, particularly those intended for a wide range of usages and where servicing may be a problem. That is, the design which enables one or more filters of the same type to be attached to the engine, directly to an integral filter head or via an adapter attached directly to the integral filter head, increases the usefulness of the engine, while at the same time reduces the number of parts that must be used and made available for servicing purposes, and minimizes the potential for servicing problems.

We claim:

1. A liquid fuel operated engine having an integral fuel filter head formed unitarily on a part of the engine, said integral fuel filter head having a socket for matingly receiving a fuel filter canister and ports, in communication with fuel lines within said engine, for delivery of clean fuel to and receipt of dirty fuel from respective ones of said fuel lines, and a fuel filter adapter detachably secured to said integral fuel filter head, said fuel filter adapter having a body formed with a base mounting socket for matingly engaging the fuel filter socket of the integral fuel filter base and at least two filter sockets for matingly receiving a respective fuel filter canister, passages being formed in said body of the adapter for enabling dirty fuel to be fed from said engine through said base mounting socket, said filter sockets and filter canisters attached thereto, and cleaned fuel to be returned through said base socket to said engine.

2. A liquid fuel operated engine according to claim 1, wherein the part of the engine on which the integral fuel filter head is formed is a cylinder head.

3. A liquid fuel operated engine according to claim 2, wherein said integral fuel filter base is formed on a horizontally projecting flange formed on a side of the cylinder head.

4. A liquid fuel operated engine according to claim 3, wherein the socket of the integral fuel filter head is located on an underside of said flange.

5. A liquid fuel operated engine according to claim 4, wherein the mounting socket of the adapter is located on a top side of the adapter body and the filter sockets are formed on a bottom side thereof.

6. A liquid fuel operated engine according to claim 4, wherein the socket of the integral fuel filter head and the filter sockets of the adapter are constructed for receiving the same types of filter canisters.

7. A liquid fuel operated engine according to claim 6, wherein the mounting socket of the adapter is coaxially superimposed over one of its filter sockets, and wherein a fuel delivery passage extends coaxially therethrough.

8. A liquid fuel operated engine according to claim 7, wherein an angle bore is formed in the body of the adapter for delivering dirty fuel, received in a recess of the mounting socket from the dirty fuel port of the integral filter head to a filter canister attached to the first filter socket, and a fuel passage is formed through the body of the adapter for delivery of fuel cleaned by the filter canister attached to the first filter socket to a second filter socket.

9. A liquid fuel operated engine according to claim 8, wherein the clean fuel delivery passage extends through the mounting and second filter sockets and is formed by an externally threaded tube which is threaded through a separating wall, located between the mounting and second filter sockets, into engagement with an internal threading of the clean fuel port of the integral filter head, a portion of the threading on at least one end of said tube corresponding to internal threading of a fuel filter canister, whereby said tube serves as a means for attaching the adapter to the integral filter head and for attaching a filter canister to the second filter socket.

10. A liquid fuel operated engine according to claim 1, wherein the mounting socket of the adapter is located on a top side of the adapter body and the filter sockets are formed on a bottom side thereof.

11. A liquid fuel operated engine according to claim 10, wherein the socket of the integral fuel filter head and the filter sockets of the adapter are constructed for receiving the same types of filter canisters.

12. A liquid fuel operated engine according to claim 11, wherein the mounting socket of the adapter is coaxially superimposed over one of its filter sockets, and wherein a clean fuel delivery passage extends coaxially therethrough.

13. A liquid fuel operated engine according to claim 12, wherein an angle bore is formed in the body of the adapter for delivering dirty fuel, received in a recess of the mounting socket from the dirty fuel port of the integral filter head, to a filter canister attached to the second filter socket, and a fuel passage is formed through the body of the adapter for delivery of fuel cleaned by a filter canister attached to a first filter socket to a second filter socket.

14. A liquid fuel operated engine according to claim 13, wherein the clean fuel delivery passage extends through the mounting and second filter sockets and is formed by an externally threaded tube which is passed through a bore in the separating wall, located between the mounting and second filter sockets, into engagement with an internal threading of the clean fuel port of the integral filter base, a portion of the threading on at least one end of said tube corresponding to internal threading of a filter canister, whereby said tube serves as a means for attaching the adapter to the integral filter head and for attaching a filter canister to the second filter socket.

15. A fuel filter adapter for converting a single fuel filter canister receiving, integral fuel filter head of a liquid fuel operated engine for use with multiple fuel filter canisters, comprising an adapter body formed on one side with a base mounting socket for matingly engaging a fuel filter socket of an integral, single canister-type filter receiving, fuel filter head of an engine, and formed on an opposite side with at least two filter sockets for matingly receiving a respective fuel filter canister, passages being formed in said body of the adapter for enabling dirty fuel to be fed through said base mounting socket, said filter sockets and filter canisters attached thereto, and cleaned fuel to be returned through said base socket to the integral fuel filter head of the engine; and means for detachably attaching said adapter body to the integral fuel filter head of the engine.

16. A fuel filter adapter according to claim 15, wherein the filter sockets of the adapter are constructed for receiving the same types of filter canisters as the integral fuel filter base that the base mounting socket is constructed to mate with.

17. A fuel filter adapter according to claim 15, wherein the mounting socket of the adapter body is coaxially superimposed over one of its filter sockets, and wherein a clean fuel delivery passage extends coaxially therethrough.

18. A fuel filter adapter according to claim 17, wherein an angle bore is formed in the body of the adapter for delivering dirty fuel from a recess in the mounting socket to a filter canister attached to the first filter socket, and a fuel passage is formed through the body of the adapter for delivery of fuel cleaned by a filter canister attached to the first filter socket to a second filter socket.

19. A fuel filter adapter according to claim 18, wherein the clean fuel delivery passage extends through the mounting and second filter sockets and is formed by an externally threaded tube which is passed through a bore in the separating wall, located between the mounting and second filter sockets, at least a portion of the threading of one end of the tube being constructed for threaded engagement with an internal threading of a clean fuel port of the integral filter head, a portion of the threading on at least an opposite end of said tube being constructed for engagement in internal threading of a fuel filter canister, and said tube serving as said means for detachably attaching said adapter body to the integral fuel filter head of the engine as well as means for attaching a filter canister to the second filter socket of the adapter.

20. A fuel filter adapter according to claim 19, wherein the fuel sockets of the adapter are constructed for receiving the same types of filter canisters as the integral fuel filter head that the mounting socket is constructed to mate with.

21. A fuel filter adapted according to claim 19, wherein the adapter is a plate-like structure.

* * * * *